United States Patent
Crump et al.

(10) Patent No.: US 11,148,362 B2
(45) Date of Patent: Oct. 19, 2021

(54) ROTARY SILO ADDITIVE MANUFACTURING SYSTEM

(71) Applicant: STRATASYS, INC., Eden Prairie, MN (US)

(72) Inventors: Sydney Crump, Wayzata, MN (US); S. Scott Crump, Wayzata, MN (US)

(73) Assignee: Stratasys, Inc., Eden Prairie, MN (US)

(*) Notice: Subject to any disclaimer, the term of this patent is extended or adjusted under 35 U.S.C. 154(b) by 206 days.

(21) Appl. No.: 16/468,928

(22) PCT Filed: Dec. 13, 2016

(86) PCT No.: PCT/US2016/066353
§ 371 (c)(1),
(2) Date: Jun. 12, 2019

(87) PCT Pub. No.: WO2018/111240
PCT Pub. Date: Jun. 21, 2018

(65) Prior Publication Data
US 2020/0016655 A1    Jan. 16, 2020

(51) Int. Cl.
*B29C 64/153* (2017.01)
*B29C 64/241* (2017.01)
(Continued)

(52) U.S. Cl.
CPC .......... *B29C 64/171* (2017.08); *B22F 12/00* (2021.01); *B29C 64/112* (2017.08);
(Continued)

(58) Field of Classification Search
CPC ... B29C 64/141; B29C 64/153; B29C 64/171; B29C 64/241; B29C 64/255
See application file for complete search history.

(56) References Cited

U.S. PATENT DOCUMENTS 7,291,002 B2 * 11/2007 Russell ................. B29C 64/112
425/447
8,172,562 B2 * 5/2012 Mattes .................. B29C 64/153
425/174.4
(Continued)

FOREIGN PATENT DOCUMENTS

DE    10 2012 009 071 A1    11/2013
GB    2543305 A *  4/2017 .............. B22F 12/00

OTHER PUBLICATIONS

International Search Report and Written Opinion for International Application No. PCT/US2016/066353, dated Nov. 28, 2017, 12 pages.
(Continued)

*Primary Examiner* — Atul P. Khare
(74) *Attorney, Agent, or Firm* — Peter J. Ims; Westman, Champlin & Koehler, P.A.

(57) ABSTRACT

A rotary additive manufacturing system for producing 3D parts in a layer-wise manner includes a silo support, a tool support, a plurality of silos, and a part developer. The tool support overlays a first side of the silo support, and is configured to rotate about a central axis relative to the silo support. The silos are each attached to the silo support and extend along the central axis from a second side of the silo support that is opposite the first side. The part developer is supported by the tool support, and is configured to build a 3D part within each of the silos in a layer-by-layer manner during rotation of the tool support relative to the silo support.

24 Claims, 12 Drawing Sheets

(51) Int. Cl.
*B29C 64/171* (2017.01)
*B22F 12/00* (2021.01)
*B29C 64/112* (2017.01)
*B29C 64/141* (2017.01)
B29C 64/259 (2017.01)
B22F 10/10 (2021.01)
B29C 64/255 (2017.01)

(52) U.S. Cl.
CPC ............ *B29C 64/141* (2017.08); *B22F 10/10* (2021.01); *B29C 64/153* (2017.08); *B29C 64/241* (2017.08); *B29C 64/255* (2017.08); *B29C 64/259* (2017.08)

(56) References Cited

U.S. PATENT DOCUMENTS

| | | | |
|---|---|---|---|
| 9,908,294 B2* | 3/2018 | Carrousel | B29C 64/364 |
| 10,821,514 B2* | 11/2020 | Corsmeier | B22F 10/20 |
| 2006/0108712 A1 | 5/2006 | Mattes | |
| 2016/0193695 A1 | 7/2016 | Haynes | |
| 2017/0348902 A1* | 12/2017 | Ohara | B33Y 50/02 |
| 2018/0311731 A1* | 11/2018 | Spicer | B22F 12/00 |

OTHER PUBLICATIONS

European Office Action, 16825612.1-1019, dated Jul. 30, 2019, 3 pages.
Chinese Office Action from corresponding Chinese Patent Application No. 201690001846.X, dated Jun. 9, 2021.

\* cited by examiner

ROTARY SILO ADDITIVE MANUFACTURING SYSTEM

CROSS-REFERENCE TO RELATED APPLICATION

This Application is a Section 371 National Stage Application of International Application No. PCT/US2016/066353, filed 13 Dec. 2016, and published as WO 2018/111240 A1 on 21 Jun, 2018, in English, the contents of which are hereby incorporated by reference in their entirety.

BACKGROUND

The present disclosure relates to systems and methods for additive manufacturing of three-dimensional (3D) parts, and more particularly, to rotary additive manufacturing systems and processes for building 3D parts by selectively curing and fusing layers of build material.

Additive manufacturing is generally a process in which a three-dimensional (3D) part is manufactured utilizing a computer model of the part. The basic operation of an additive manufacturing system consists of slicing a three-dimensional computer model into thin cross-sections, translating the result into two-dimensional position data, and feeding the data to control equipment which manufactures the three-dimensional part in a layer-wise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes, for example.

As a particular example, in a selective laser sintering (SLS) based additive manufacturing system, a 3D part may be printed from a digital representation of the 3D part in a layer-by-layer manner by tracing a laser beam across a part bed containing a layer of powder-based build material. For each layer, the laser beam draws a cross-section for the layer on the surface of the powder layer, which sinters or melts and solidifies the drawn pattern. After the layer is completed, the system's platform or part bed is lowered by a single layer increment. A fresh layer of powder-based build material may then be applied to cover the previous layer, and the laser beam may draw across the fresh layer of powder to pattern the next layer, which is also sufficiently joined to the previous layer. This process may be repeated for each successive layer. Afterwards, the powder not processed by the laser is simply brushed away or removed when the 3D part is removed from the part bed and the resulting 3D part may undergo subsequent processing or cleaning.

SUMMARY

Embodiments of the present disclosure are directed to a rotary additive manufacturing system for producing 3D parts in a layer-wise manner, and methods of building one or more 3D parts in a layer-wise manner using the system. In some embodiments, the system includes a silo support, a tool support, a plurality of silos, and a part developer. The tool support overlays a first side of the silo support, and is configured to rotate about a central axis relative to the silo support. The silos are each attached to the silo support and extend along the central axis from a second side of the silo support that is opposite the first side. The part developer is supported by the tool support, and is configured to build a 3D part within each of the silos in a layer-by-layer manner during rotation of the tool support relative to the silo support.

In some embodiments of the system, the part developer includes a selective excitation device that is configured to selectively heat part portions of a build layer of build material in each silo to form a layer of the corresponding part. In some embodiments, the selective excitation device includes a plurality of laser sources that are configured to direct electromagnetic energy to the part portions of the build layers, or at least one laser source and a laser director that is configured to direct electromagnetic energy from the laser source to the part portions of the build layers.

In some embodiments, the selective excitation device includes a printing device and a heating device. The printing device is configured to apply a print material on print areas of the build layers corresponding to the part portions. The heating device includes at least one heating element that is configured to apply heat to the build layers. The print material on the print areas of the build layers absorbs the heat in the part portions. Some embodiments of the printing device include an ink jetting head. Embodiments of the at least one heating element include an infrared heating element, a flash lamp, an element configured to discharge an electron beam, or other suitable heating element.

In some embodiments, an amount of heat applied to each build layer from the selective excitation device increases with increasing radial distance from the central axis. In some embodiments, the selective excitation device is displaced from the silo support along the central axis a distance that decreases with increasing radial distance from the central axis. In some embodiments, an amount of heat discharged from the selective excitation device increases with increasing radial distance from the central axis.

In some embodiments, the part developer includes a build layer analyzer that is configured to detect at least one of a temperature of each build layer and a condition of the build material in each build layer. In some embodiments, the condition of the build material detected using the build layer analyzer includes a powdered condition, a melted condition, or a solid condition. In some embodiments, the build layer analyzer includes at least one temperature sensor, such as one or more infrared detectors, for example. In some embodiments, the build layer analyzer includes a plurality of capacitance sensors.

In some embodiments, the system includes a cooling unit that is configured to cool the tool support. In some embodiments, the system includes a heating unit that is configured to heat the silo support, and/or each of the silos. In some embodiments, the system includes thermal insulation between the tool support and the silo support.

In some embodiments, the part developer includes a spreader that is configured to distribute build material within a build plane of each silo to form each build layer during rotation of the tool support relative to the silo support. In some embodiments, the spreader includes a knife or a doctor blade. In some embodiments, the spreader includes a roller having an axis of rotation that is transverse to the central axis. The roller of the spreader may be conical or cylindrical.

In some embodiments, the rotary additive manufacturing system includes at least one container that is configured to contain build material, and the part developer includes a delivery device that is configured to deliver the build material from the at least one container to the spreader. In some embodiments, the at least one container is supported by the tool support, and/or the silo support. In some embodiments, each of the at least one container includes a base that is configured to support the build material, and a motorized lift mechanism that is configured to move the base relative to the silo support along the central axis. In some embodiments, each of the at least one container has an azimuthal position that is between the azimuthal positions of a pair of the silos. In some embodiments, the delivery device includes an auger.

In some embodiments, the build material includes a powdered material. Exemplary embodiments of the powdered material include a semi-crystalline polymer, a metal, or an amorphous polymer.

In some embodiments of the system, each of the plurality of silos includes one or more sidewalls extending along the central axis from the silo support, and a build platen that is contained in an interior of the silo. The build platen is configured to move along the central axis relative to the one or more sidewalls and the silo support. In some embodiments, the system includes at least one gantry that is configured to drive movement of each of the build platens along the central axis relative to the one or more sidewalls and the silo support.

In some embodiments, each of the plurality of silos is removably attached to the silo support.

In some embodiments, at least one of the plurality of silos includes a removable insert within the interior of the silo and between the one or more sidewalls. The removable insert defines an internal cavity that receives the build platen.

In some embodiments, the system includes a frame that is configured to support the tool support and the silo support. In some embodiments, the tool support is configured to rotate about the central axis relative to the frame. In some embodiments, the silo support is configured to rotate about the central axis relative to the frame.

In some embodiments of the method, a build layer is formed within a build plane of one or more of the silos using a spreader during rotation of a tool support relative to a silo support about a central axis. Part portions are formed within each build layer using a selective excitation device during rotation of the tool support relative to the silo support about a central axis. The part portions correspond to a layer of each of the 3D parts. These steps are then repeated until at least one of the 3D parts is printed. In some embodiments, the each of the parts are separated from a remainder of the corresponding build layers that is attached to the part portions This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DEFINITIONS

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyimide", "one or more polyamides", and "polyamide(s)" may be used interchangeably and have the same meaning.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION OF ILLUSTRATIVE EMBODIMENTS

Figure 1:
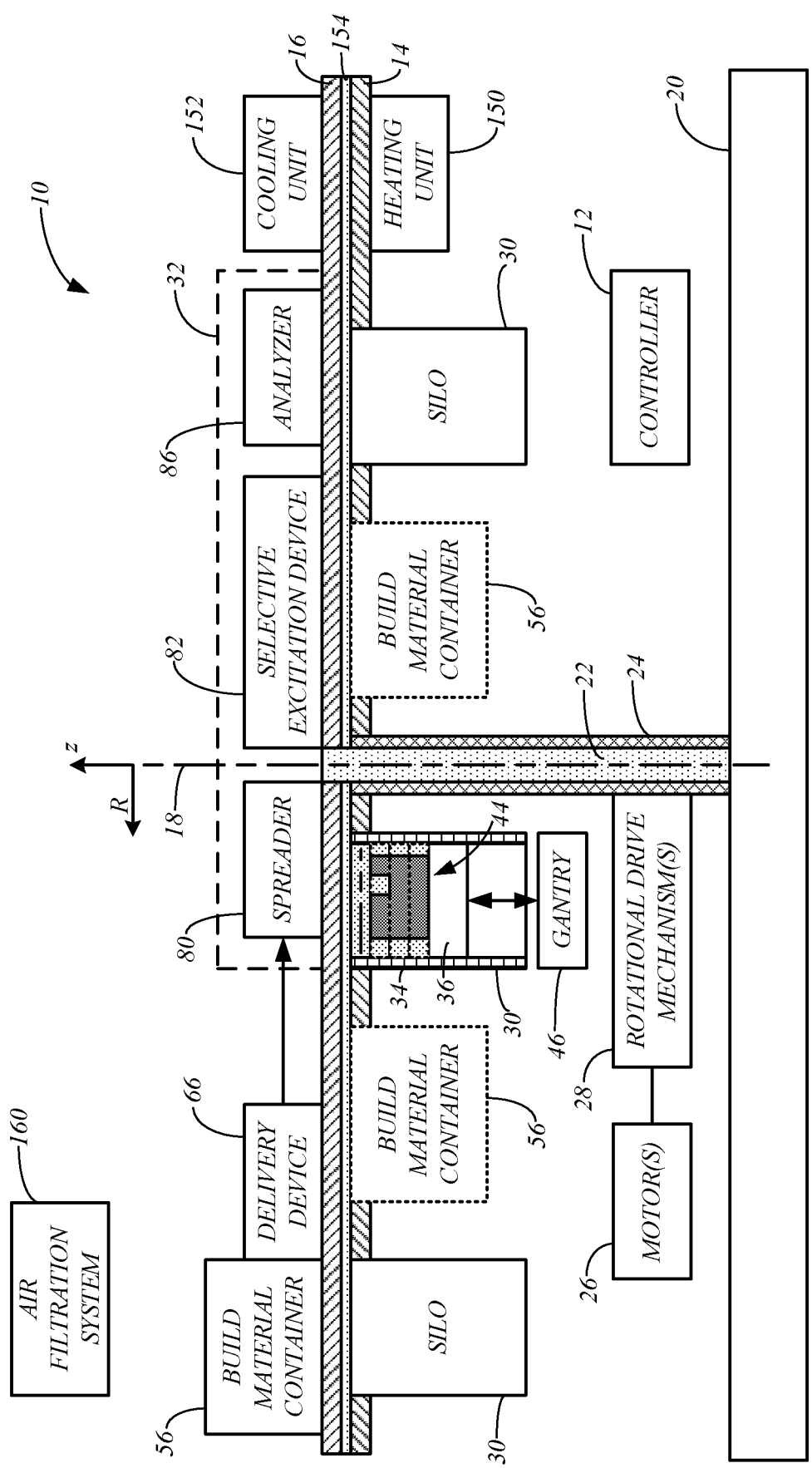
FIGS. 1 and 2 respectively are schematic side and isometric views of an exemplary rotary additive manufacturing system, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form, in order to not obscure the embodiments in unnecessary detail.

Embodiments of the present disclosure may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

Figure 2:
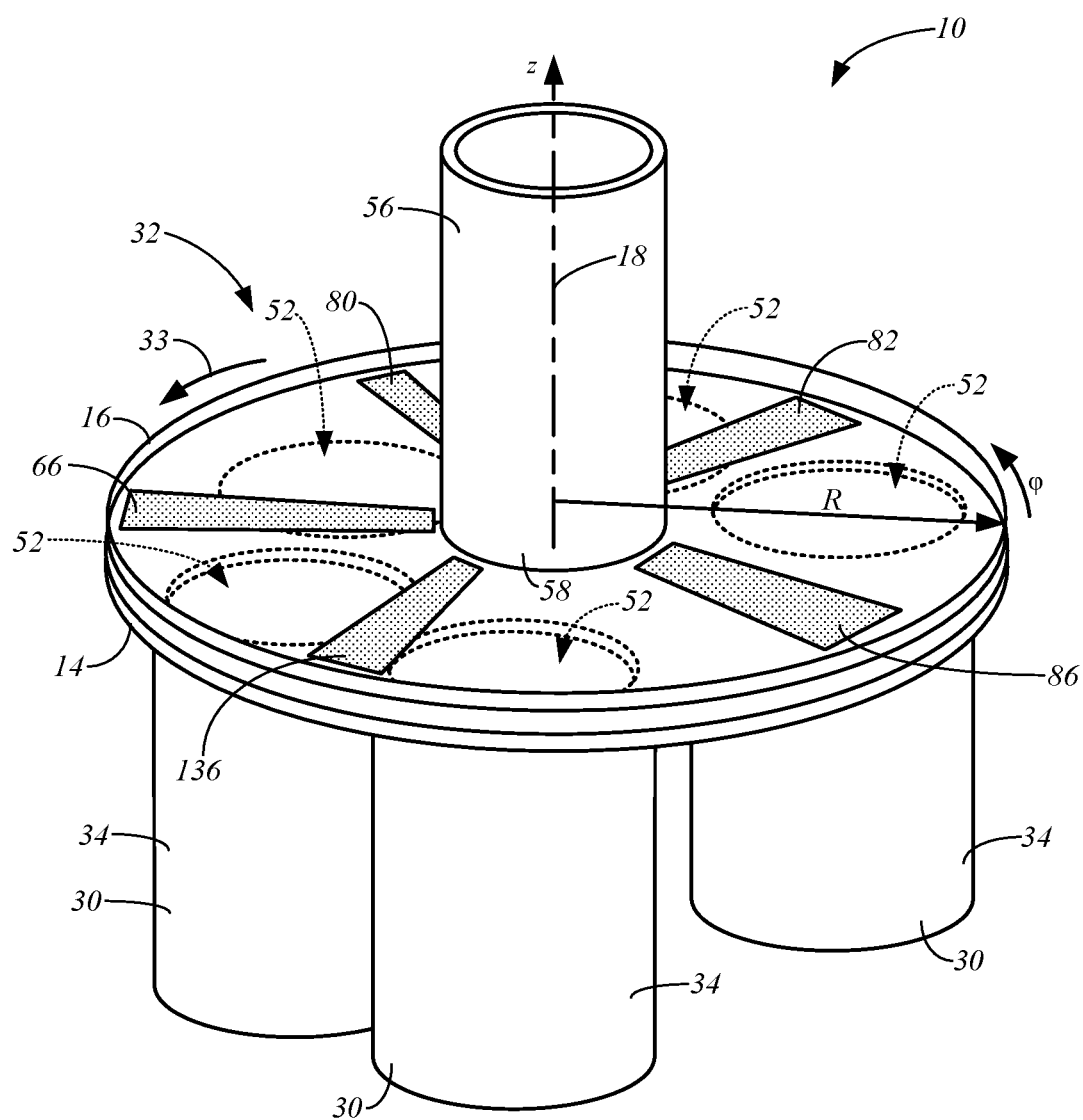

Embodiments of the present disclosure relate to rotary additive manufacturing systems and processes for building 3D parts. FIGS. 1 and 2 respectively are schematic side and isometric views of an exemplary rotary additive manufacturing system 10, in accordance with embodiments of the present disclosure.

System 10 includes a controller 12 (FIG. 1), which represents one or more processors that are configured to execute instructions, which may be stored locally in memory of the system 10 or in memory that is remote to the system 10, to control components of the system 10 to perform one or more functions described herein. Any suitable patent subject matter eligible computer readable media may be utilized for the memory including, for example, hard disks, CD-ROMs, optical storage devices, or magnetic storage devices. Such computer readable media or memory do not include transitory waves or signals.

The processors of the controller 12 are components of one or more computer-based systems. The controller 12 includes one or more control circuits, microprocessor-based engine control systems, one or more programmable hardware components, such as a field programmable gate array (FPGA), and/or digitally-controlled raster imaging processor systems that are used to control components of the system 10 to perform one or more functions described herein. The controller 12 controls components of the system 10 in a synchronized manner based on printing instructions received from a host computer or a remote location, for example.

The controller 12 communicates over suitable wired or wireless communication links with components of the system 10. The controller 12 communicates over a suitable wired or wireless communication link with external devices, such as a host computer or other computers and servers, such as over a network connection (e.g., local area network (LAN) connection), for example.

The controller 12 receives information relating to sliced layers of 3D parts to be built using the system 10. The controller 12 controls components of the system 10 to perform a build process, during which the slices of the parts are individually built to print the 3D parts in a layer-by-layer manner. As discussed in greater detail below, in some embodiments, the system 10 facilitates a build process during which multiple 3D parts are built simultaneously.

The system 10 includes a silo support 14 and a tool support 16. The supports 14 and 16 are generally in the form of trays having a circular (FIG. 2) or other suitable shape. The tool support 16 overlays the silo support 14 and is configured to rotate about a central axis 18 relative to the silo support 14. However, other configurations of the supports 14 and 16 are within the scope of the present disclosure.

In the present description, a direction parallel to the silo support 14 and the tray support 16 and pointing outwardly from the central axis 18 is referred to as the radial direction R, a direction parallel to the silo support 14 and the tray support 16 and perpendicular to the radial direction R is referred to herein as the azimuthal direction φ, and a direction perpendicular to the silo support 14 and the tool support 16 is referred to herein as the vertical direction Z, as illustrated in FIG. 2. The term "radial position," as used herein, refers to a position at a specific radial distance from the central axis 18. The term "azimuthal position," as used herein, refers to a position at a specific azimuthal angle relative to a predetermined reference point. The term "vertical position," as used herein, refers to a position over a plane that intersects the central axis 18 at a specific point.

The silo support 14 and the tray support 16 are supported by a frame 20 of the system 10, as illustrated in FIG. 1. The tray support 16 is configured to rotate about the central axis 18 relative to the frame 20. In some embodiments, the silo support 14 has a fixed azimuthal position about the central axis 18 relative to the frame 20. In other embodiments, the silo support 14 is configured to rotate about the central axis 18 relative to the frame 20 and the tool support 16.

The tool support 16 and/or the silo support 14 may be supported for rotation about the central axis 18 using any suitable technique. In some embodiments, the tool support 16 is attached to a shaft 22 that is connected to the frame 20. The shaft 22 supports the tool support 16 for rotation about the central axis 18. In some embodiments, the silo support 14 is attached to a shaft 24 that is supported by the frame 20. In some embodiments, the shaft 24 supports the silo support 14 for rotation about the central axis 18 relative to the frame 20.

The system 10 includes one or more motors 26 and drive mechanisms 28 that are configured to drive rotation of the tool support 16 and/or the silo support 14 about the central axis 18 relative to each other and/or the frame 20. The one or more drive mechanisms 28 can take on any suitable form and may include a gear drive, a belt drive, or other suitable drive mechanism.

The silo support 14 serves as a supporting structure for a plurality of silos 30, in which the 3D parts are built. Each of the silos 30 are attached to the silo support 14 and extend away from the silo support 14 and the tool support 16 along the central axis 18, as shown in FIGS. 1 and 2. As used herein, a "silo" includes a structure having a continuous sidewall that defines and interior region in which a 3D part is built where a silo has a substantially less volume than a typical 3D printer. In some embodiments, the silos 30 are removably attached to the silo support 14. That is, the attachment of the silos 30 to the silo support 14 is configured to allow for easy removal and replacement of the silos 30, such as by hand. In other embodiments, the silos 30 can be fixedly attached to the silo support 14.

The tool support 16 serves as a supporting structure for a part developer 32 that is configured to build one or more 3D parts within each of the silos 30 in a layer-by-layer manner. As a result, the system 10 is configured to simultaneously print multiple 3D parts.

In some embodiments, the tool support 16 rotates continuously in the same direction, such as the direction indicated by arrow 33 in FIG. 2, about the axis 18 relative to the silo support 14 throughout the build process. In other embodiments, the tool support 16 non-continuously rotates in the same direction about the axis 18 relative to the silo support during the build processes. That is, the tool support 16 may rotate about the axis 18 at a non-constant speed and/or may periodically stop its rotation about the central axis 18 relative to the silo support 14. In some embodiments, the tool support 16 may periodically reverse its direction of rotation about the axis 18 relative to the silo support 14 during the build process.

As mentioned above, in some embodiments, the silo support 14 has a fixed azimuthal position relative to the frame 20. The silo support 14 takes on this fixed azimuthal position during the build process of one or more 3D parts in the silos 30 using the part developer 32. Following the completion of a build process, the silo support 14 is configured to rotate relative to the frame 20 to adjust the azimuthal positions of each silo 30 in alignment with a load/unload location relative to the frame 20, in which the silo 30 may be removed from the silo support 14.

Figure 3:
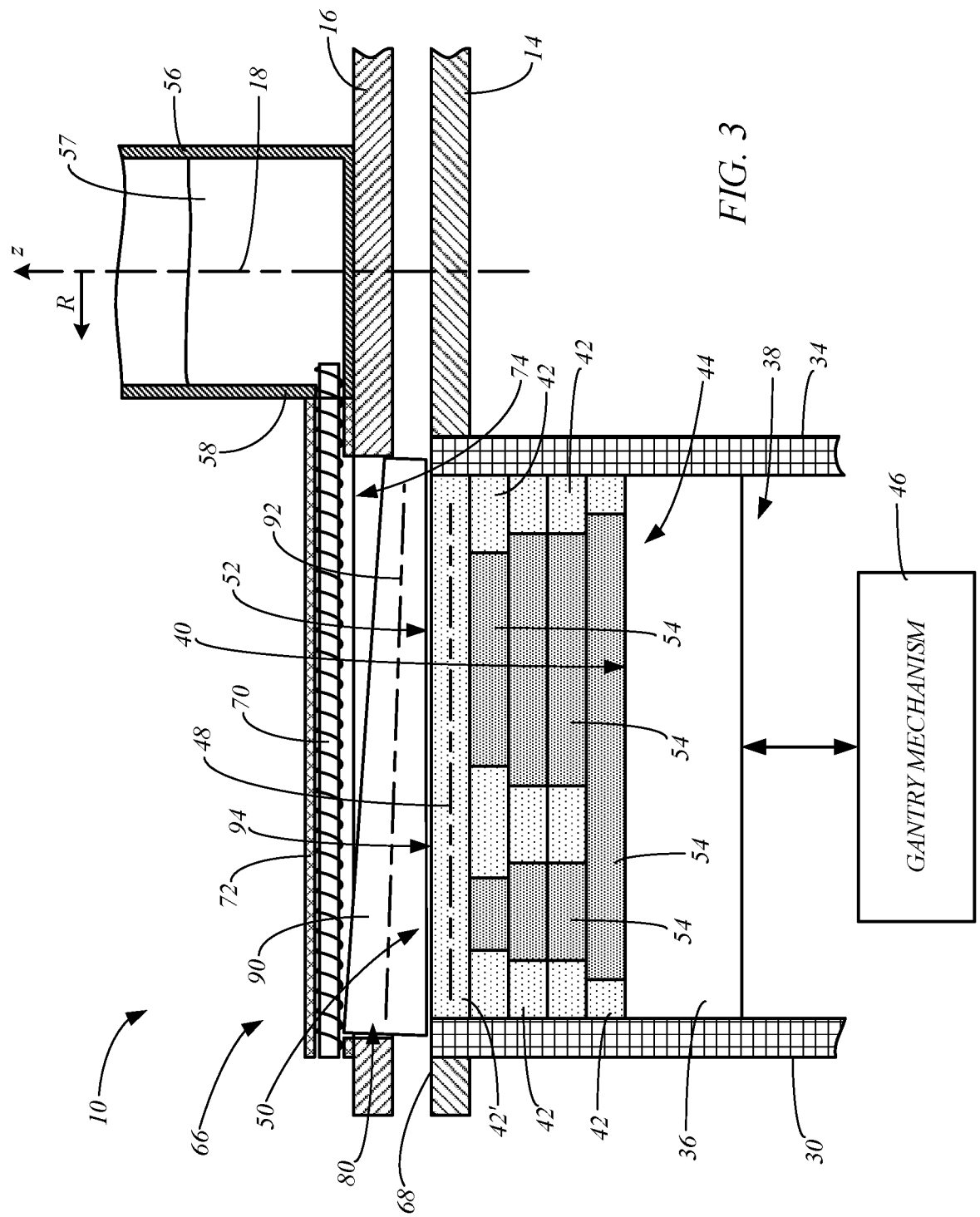
FIGS. 3-6 are simplified side cross-sectional views of portions of the system illustrating exemplary embodiments of the present disclosure.

Each of the silos 30 includes one or more sidewalls 34 extending along the central axis 18 from the silo support 14, as best shown in FIG. 3, which is a simplified side cross-sectional view of a portion of the system 10. For example, the silos 30 may be cylindrical and include a single sidewall 34, or the silos 30 may have a rectangular or another multi-sided cross-sectional shape, resulting in multiple sidewalls 34. In some embodiments, a portion of the one or more sidewalls may be formed by the silo support 14.

Each of the silos 30 includes a build platen 36 within an interior 38 of each silo 30. The build platen 36 has a build surface 40 that supports build layers 42 of the build material and the 3D part 44 during the build process. The build platen 36 is sized in accordance with the cross-sectional area of the interior 38 of the silo 30 to form a seal with the one or more sidewalls 34 to prevent build material from leaking out of the silo 30. The system 10 includes one or more gantry mechanisms 46 that is configured to lower each build platen 36 relative to the sidewalls 34 of the silo 30 along the central axis 18 (z-axis) after the processing of a current top build layer 42' by the part developer 32 to make room for a new top build layer 42'. The gantry mechanism 46 is motorized and can take on any suitable form.

During a build process, the current top build layer 42' is formed in a build plane 48 of a working area 50 adjacent an opening 52 to each of the silos 30, as shown in FIG. 3. Initially, the surface 40 of the build platen 36 is raised to a position that is adjacent the build plane 48 to support the first top build layer 42'. The surface 40 may include a release or disposable layer that receives a first top build layer 42'. The part developer 32 processes each top build layer 42' into processed build layers 42 that include part portions 54 corresponding to a slice of the 3D part 44. The part portions 54 are bonded to underlying part portions 54 (if present). The gantry mechanism 46 then lowers the build platen 36 along the central axis 18 or z-axis a distance corresponding to the thickness of the next top build layer 42', and the part developer 32 processes the top build layer 42' to form another processed build layer 42 including part portions 54 of the next slice of the 3D part 44. This process continues until the 3D parts 44 are printed in the silos 30.

The printed 3D parts may be discharged from the silos 30 while the silos 30 remain attached to the silo support 14, or the parts may be removed from the silos 30 after detaching the silos 30 from the silo support 14. In some embodiments, the layers 42 forming a part 44 may be discharged from one of the silos, such as by lowering the build platen 36, while the parts 44 continue to be built in the remaining silos 30. A new part may then be started in the silo 30 where the layers 42 have been discharged. After the layers 42 that include the part 44 are removed from a silo 30, the build material of the build layers 42 that was not used to form a part portion 54 can be separated from the 3D parts 44 and used in future build processes.

The layer-wise building processes described herein may be combined with other additive manufacturing techniques, such as fused deposition modeling, PolyJet, and/or other additive manufacturing techniques.

The build material may take on any suitable form. In some embodiments, the build material is a powdered material, where the build material can be a semi-crystalline polymer, a metal, an amorphous polymer, a ceramic, combinations thereof, and/or other suitable material. When printing 3D parts with polymeric material using the system 10, the build material can include particulate or filament fillers.

Some embodiments of the system 10 include one or more build material containers 56 that are each configured to contain the build material for use during the build process. In some embodiments, the container 56 is supported by the tool support 16, as shown in FIGS. 1, 2 and 3. In some embodiments, the container 56 is centrally located on the tool support 16, as shown in FIGS. 2 and 3. In some embodiments, the container 56 is a cylindrical container that is substantially coaxial to the central axis 18. Additional exemplary embodiments of the container 56 include positioning the container 56 at a non-centralized location on the tool support 16, and/or using a non-cylindrically shaped container 56. In accordance with this embodiment, build material 57 (FIG. 3) is generally dispensed from a location that is at or near a bottom 58 of the container 56.

Figure 4:
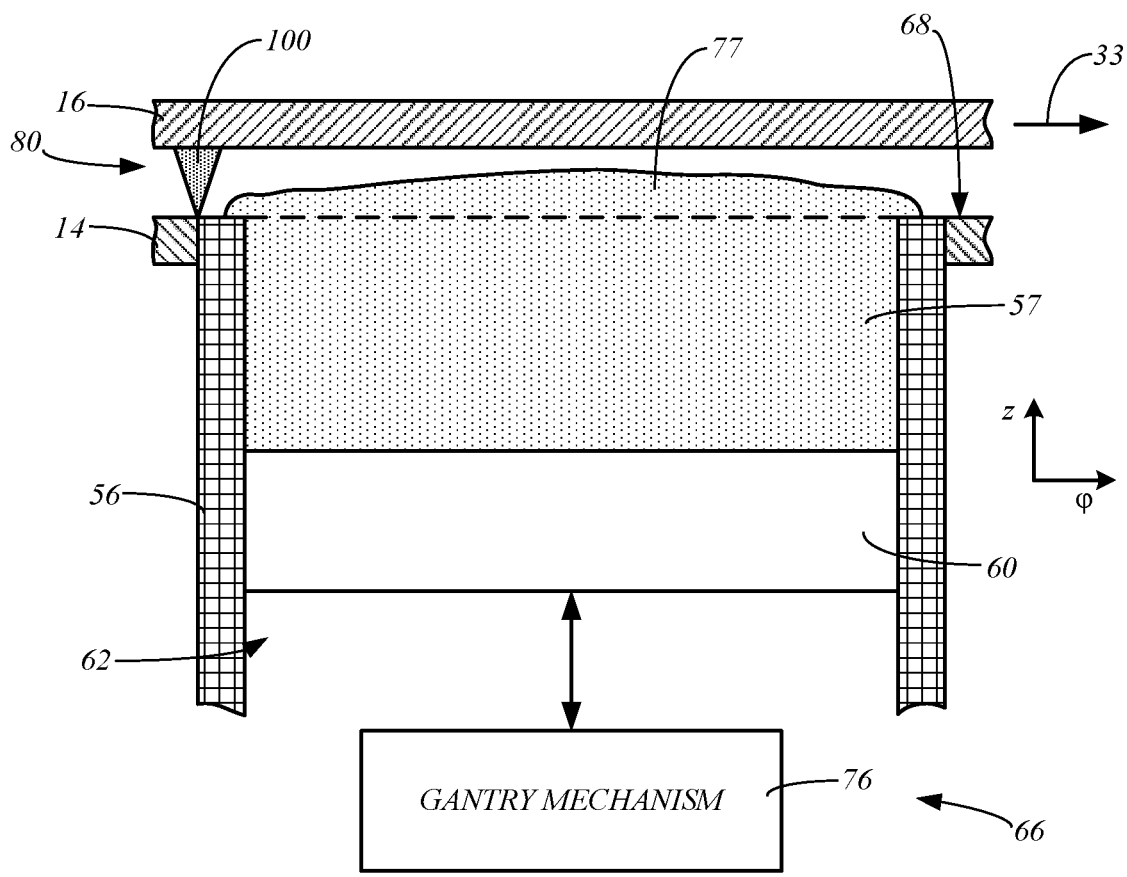

In some embodiments, the one or more build material containers 56 are supported by the silo support 14, as indicated in phantom lines in FIG. 1, and illustrated in the simplified cross-sectional view of a portion of the system 10 shown in FIG. 4. In some embodiments, the build material 57 is supported on a base 60 located within an interior 62 of the container 56, as shown in FIG. 4. In some embodiments, the container or containers 56 each have an azimuthal position that is between the azimuthal positions of two of the silos 30, such as indicted in FIG. 1.

In some embodiments, the system 10 includes a delivery device 66 for delivering the build material 57 from the container 56 to the part developer 32. The delivery device 66 may take on any suitable form.

In some embodiments, the delivery device 66 includes a mechanism that is configured to deliver the build material 57 along a radial path relative to the central axis 18 to distribute the build material 57 for processing by the part developer 32, such as over a top surface 68 of the silo support 14, and/or within the working areas 50 of the silos 30. In some embodiments, the mechanism of the delivery device 66 includes an auger 70, as shown in FIG. 3. In some embodiments, the auger 70 extends in the radial direction from the build material container 56 and accesses the build material 57 adjacent the bottom 58 of the container 56. In some embodiments, the auger 70 is contained in a tube 72 having one or more openings 74, through which the build material 57 is discharged. Rotation of the auger 70 drives the build material 57 from the container 56 along the radial path, and discharges the build material 57 over the top surface 68 or the working areas 50 for processing by the part developer 32.

In some embodiments, such as when the container 56 is supported by the silo support 14, the delivery device 66 includes a motorized gantry mechanism 76, as shown in FIG. 4. The gantry mechanism 76 is configured to move the base 60 relative to the container 56 along the central axis 18 (z-axis) to raise a portion 77 of the build material 57 above the top surface 68 of the silo support 14 for processing by the part developer 32.

In some exemplary embodiments, the part developer 32 includes a spreader 80, a selective excitation device 82, and/or a build layer analyzer 86, as illustrated in FIG. 1. In some embodiments, these components are each supported by the tool support 16, and rotate with the tool support 16 about the central axis 18 relative to the silo support 14 during a build process.

Embodiments of the spreader 80 are configured to distribute the build material 57 received from the delivery device 66 to form the top build layer 42' in the build plane 48 of the working area 50 of each silo 30. In some embodiments, the spreader 80 extends in the radial direction over radial positions spanning the radial positions covered by the working areas 50 and the top build layers 42' of each silo 30.

Figure 5:
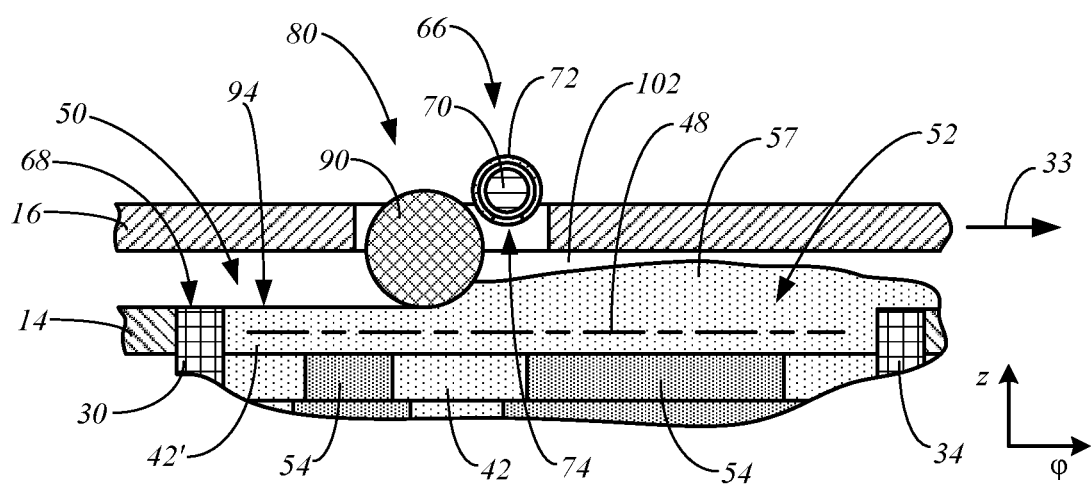

In some embodiments, the spreader 80 includes a roller 90 having an axis of rotation 92, as shown in FIG. 3 and FIG. 5, which is a simplified cross-sectional view of a portion of the system 10, in accordance with exemplary embodiments of the present disclosure. In some embodiments, the axis of rotation 92 generally extends in the radial direction. The roller 90 is configured to spread the build material 57 delivered by the delivery device 66 in the working area 50 of each silo 30 to form the top build layer 42' . In some embodiments, the roller 90 flattens a top surface 94 of the top build layer 42' such that the top build layer 42' has a uniform thickness measured along the z-axis, as illustrated in FIGS. 3 and 5. In some embodiments, the roller 90 presses the build material 57 into the working area 50 to form the top build layer 42'. In some embodiments, the roller 90 may be cylindrical, or conical (FIG. 3).

Figure 6:
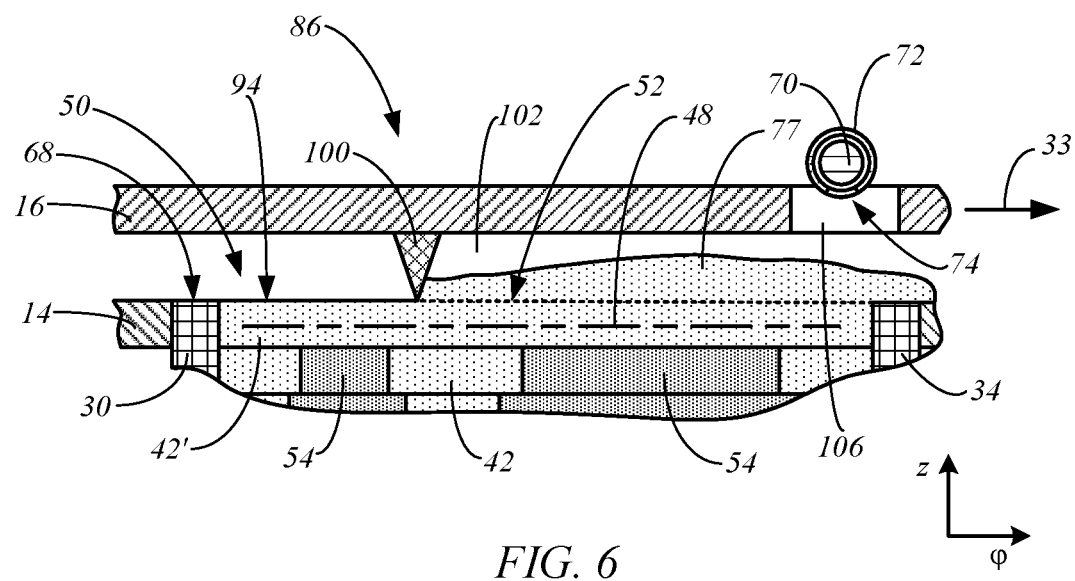
Figure 7:
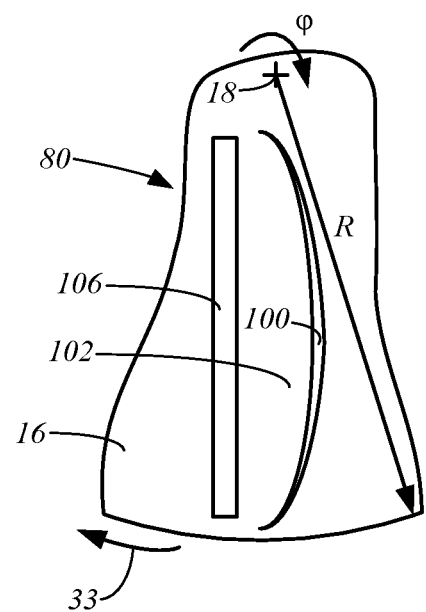
FIG. 7 is a simplified bottom plan view of a spreader, in accordance with exemplary embodiments of the present disclosure.

In some embodiments, the spreader 80 comprises a knife or doctor blade 100, as shown in FIG. 4, the cross-sectional view of FIG. 6, and the bottom plan view of the tool support 16 shown in FIG. 7. The blade 100 generally extends in the radial direction over radial positions that overlap the radial positions of the working areas 50 and the openings 52 to the silos 30. In some embodiments, the blade 100 extends along the central axis 18 or z-axis toward the silo support 14 and the working areas 50. In some embodiments, the blade 100 has a convex shape, as shown in FIG. 7.

The blade 100 receives the build material 57 on a leading side 102 of the blade relative to the direction 33 of rotation of the tool support 16 relative to the silo support 14. For example, the build material 57 may be delivered to the leading side 102 of the blade 100 using the delivery device 66 illustrated in FIG. 4, which raises the portion 77 of the build material 57 above the surface 68 of the silo support 14. When the delivery device 66 includes a mechanism for delivering the build material 57 along a radial path over the silo support 14, such as the auger 70, the build material 57 may be delivered to the leading side 102 of the blade 100 through a slot 106, for example, as illustrated in FIG. 6.

In some embodiments, the blade 100 flattens the top surface 94 of the build layer 42' such that the build layer 42' has a uniform thickness measured along the z-axis, as illustrated in FIG. 6. In some embodiments, the blade 100 presses the build material 57 into the working area 50 to form the top build layer 42'.

After the top build layer 42' has been formed in a given silo 30, the rotation of the tool support 16 relative to the silo support 14 positions selective excitation device 82 for processing the layer 42'. The selective excitation device 82 thermally excites the part portions of the layer 42' to melt, fuse and/or otherwise transform the portions of the build layer 42' into the part portions 54 that form the layer of the 3D part 44 during rotation of the tool support 16 relative to the silo support 14 about the axis 18. In some embodiments, the selective excitation device extends in the radial direction over radial positions spanning the radial positions covered by the working areas 50 and the top build layers 42' of each silo 30. The selective excitation device 82 can take on any suitable form. Exemplary embodiments of the selective excitation device 82 include heating elements, printing devices, laser devices, and/or other suitable devices.

Figure 8:
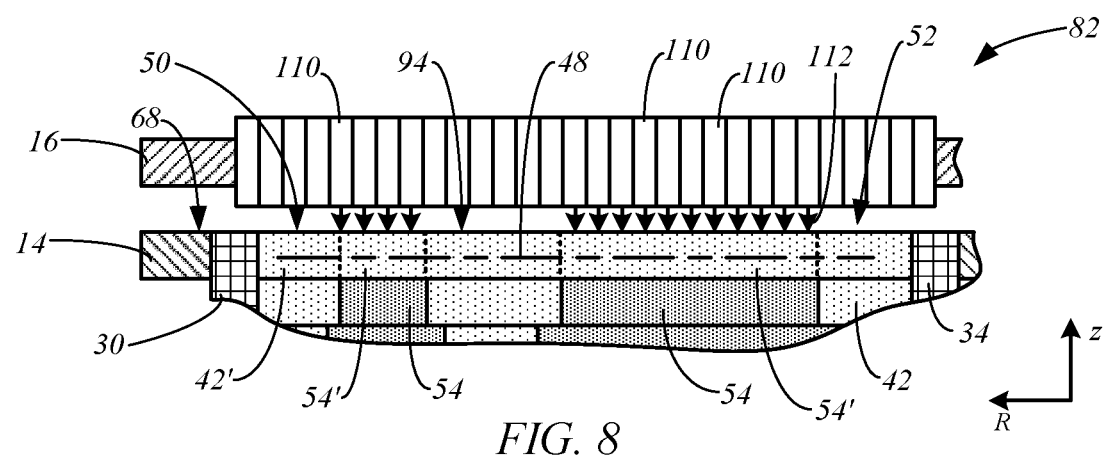
FIG. 8 is a simplified cross-sectional view of an exemplary selective excitation device, in accordance with embodiments of the present disclosure.

FIG. 8 is a simplified cross-sectional view of an exemplary selective excitation device 82, in accordance with embodiments of the present disclosure. In some embodiments, the selective excitation device 82 comprises one or more laser sources 110 that are each configured to discharge electromagnetic energy or laser beams 112 to excite portions 54' of the top build layer 42' and transform the portions 54' into part portions 54. In some embodiments, the selective excitation device 82 includes a plurality of laser sources 110. In some embodiments, the laser sources 110 are formed in a row that extends across the radial positions of the working areas 50 and the openings 52 to the silos 30. In some embodiments, the laser sources 110 are each oriented at a different radial position. In some embodiments, the laser sources 110 have the same or similar (i.e., within 1-5 degrees) azimuthal position on the tool support 16. In some embodiments, the laser sources 110 include an array of laser sources including multiple laser sources 110 having the same radial position and multiple laser sources 110 having the same azimuthal position. An exemplary array of laser sources is disclosed in Hedlund et. al. (Publication No. WO2016/085965).

The laser sources 110 are selectively activated to discharge the laser beams 112 only at the portions 54' of the layer 42' that are to be thermally transformed into the part portions 54, as the tool support 16 rotates about the axis 18 relative to the silo support 14 and the top build layer 42' to form the part portions 54.

In some embodiments, the laser sources 110 discharge the electromagnetic energy or laser beams 112 directly at the top build layer 42', as shown in FIG. 8. Alternatively, the laser sources 110 may be routed to the top build layer 42' through one or more optical elements (e.g., mirror, lens, prism, etc.).

Figure 9:
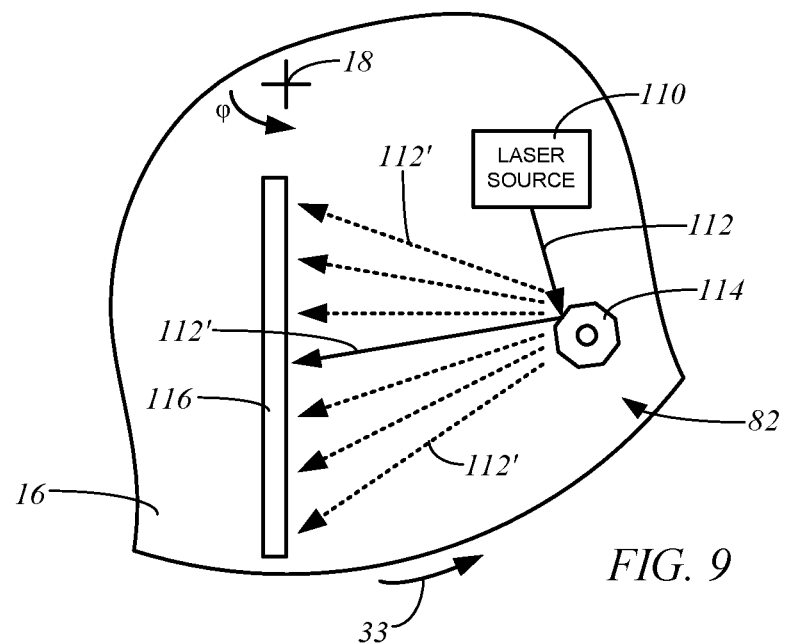
FIG. 9 is a simplified top view of a portion of an exemplary tool support and a selective excitation device, in accordance with embodiments of the present disclosure.

In some embodiments, the selective excitation device 82 includes a single laser source 110 and a laser director 114, as shown in the simplified top view of a portion of the tool support 16 of FIG. 9. In some embodiments, the laser beam 112 output from the laser source 110 is directed by the laser director 114 at the part portions 54' of the layer 42', as indicated by beams 112' in FIG. 9. In some embodiments, the laser director 114 is in the form of a rotating polygonal mirror (FIG. 9), a digital light processing chip, or another suitable device. When the laser director 114 includes the rotating polygonal mirror, the laser source 110 is selectively activated to discharge pulses of the beam 112, such that the rotating polygonal mirror reflects the pulse of the beam 112 at the desired locations on the build layer 42' as a beam 112', as indicated by the beams 112' shown in phantom lines in FIG. 9.

Figure 10:
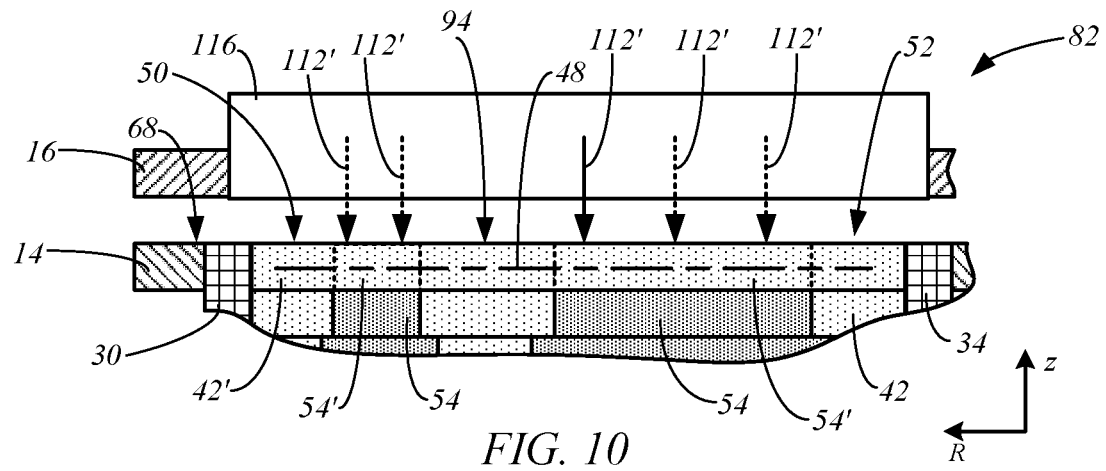
FIG. 10 is a simplified side cross-sectional view of an exemplary selective excitation device, in accordance with embodiments of the present disclosure

In some embodiments, the beam 112 and/or the beams 112' are substantially parallel to a plane extending perpendicularly to the central axis 18. In some embodiments, the selective excitation device 82 includes optics 116 (e.g., mirror, lens, prism, etc.) that direct the beams 112' to the part portions 54', as shown in FIG. 9 and FIG. 10, which is a simplified side cross-sectional view of an exemplary selective excitation device 82, in accordance with embodiments of the present disclosure. In some embodiments, the optics 116 includes a wedge mirror that directs the beams 112' to travel substantially parallel to the axis 18 and to the part portions 54'.

Figure 11:
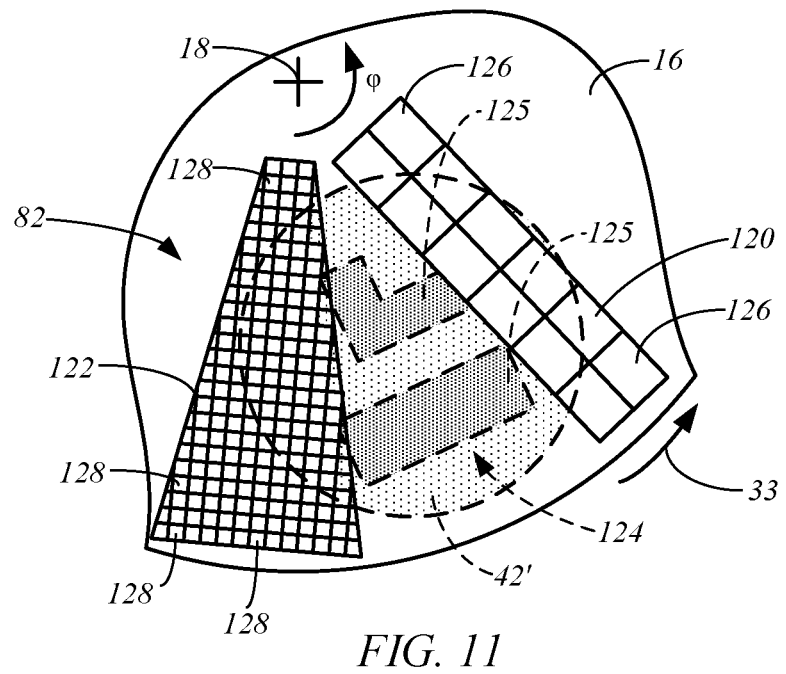
FIG. 11 is a simplified top view of a portion of the tool support and an exemplary selective excitation device, in accordance with embodiments of the present disclosure.

FIG. 11 is a simplified top view of a portion of the tool support 16 and an exemplary selective excitation device 82, which includes a printing device 120 and at least one heating device 122. The printing device 120 is configured to print an image 124 through the application of a print material to print areas 125 on the desired part portions 54' of the top build layer 42', as the tool support 16 rotates relative to the silo support 14, as shown in FIG. 11.

The printing device 120 can take on any suitable form. In some embodiments, the printing device 120 extends in the radial direction over radial positions spanning the radial positions covered by the working areas 50 and the top build layers 42' of each silo 30. The printing device 120 includes one or more print heads 126, such as an array of print heads 126. Each of the one or more print heads 126 is an ink jetting head that is configured to discharge the print material to the print areas 125 of the top build layer 42' using conventional techniques. Other suitable forms of the printing device 120 include a transfer printing device, in which the image 124 is initially printed to an intermediate substrate (e.g., a film, a roller, etc.), then transferred from the intermediate substrate to the top build layer 42'.

Figure 12:
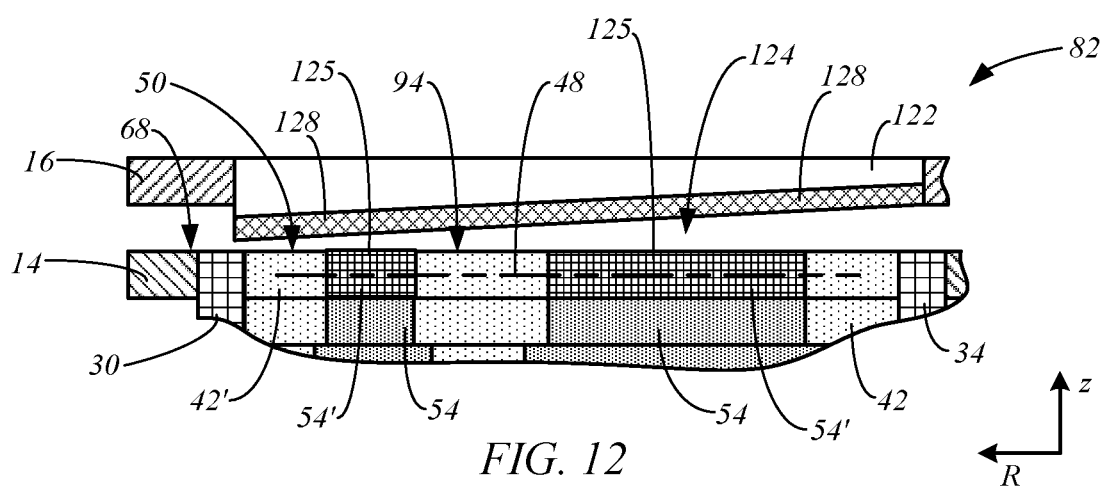
FIG. 12 is a simplified side cross-sectional view of an exemplary heating device overlaying a working area of a silo, in accordance with embodiments of the present disclosure.

FIG. 12 is a side cross-sectional view of an exemplary heating device 122 overlaying a working area 50 of a silo 30, in accordance with embodiments of the present disclosure. The heating device 122 is configured to apply heat to the top build layer 42'.

The print material is selected to absorb the heat applied by the heating device 122. Areas of the top surface of the top build layer 42' that do not receive the image 124 do not absorb as much of the heat discharged from the heating device 122 as the print areas 125. The additional heating of the print areas 125 causes the corresponding build material to transform into the part portions 54 and bond to any underlying part portions 54, while the remaining areas of the top build layer 42' that did not receive the image 124 are not melted.

The heating device 122 may take on any suitable form, and may include one or more heating elements 128 that are configured to apply the heat to the top build layers 42' of the working areas 50 of the silos 30 during rotation of the tool support 16 relative to the silo support 14 about the central axis 18. In some embodiments, the one or more heating elements extend in the radial direction to cover the working areas 50 and the top build layers 42' of each silo 30. The one or more heating elements 128 can each include an infrared heating element that discharges electromagnetic radiation in a wavelength range that is tuned for absorption by the print material in the print areas 125. Additional exemplary embodiments of each of the at least one heating element include a flash lamp, a heating element configured to discharge an electron beam (E-beam), a tungsten halogen bulb, a laser source, or another suitable heating element.

In some embodiments, the heat or electromagnetic energy applied to the top build layers 42' by the selective excitation device 82, such as the heating device 122, varies with radial distance from the central axis 18. The heat applied to the top build layers 42' by the selective excitation device 82 increases with increasing radial distance from the central axis. This allows the selective excitation device 82 to provide a uniform dose of heat energy to the top build layer. Varying the energy intensity along the radial direction can compensate for the varying linear speed of portions of the top build layer 42' during rotation of the tool support 16 relative to the silo support 14 due to their different radial distances from the axis 18.

The selective excitation device 82 discharges more heat with increasing radial distance from the central axis. The selective excitation device 82 can include a plurality of heating elements that extend in the radial direction, and the heating elements located at a greater radial distance from the central axis discharge a greater amount of heat or electromagnetic energy. For example, the laser sources 110 shown in FIG. 8, which are distributed in the radial direction, may be configured such that the laser sources 110 located a greater distance from the central axis 18 discharge beams 112 having more energy than the laser sources located closer to the central axis 18. Similar configurations may be used for the heating elements 128 of the heating device 122 (FIG. 11).

The selective excitation device 82 can also include a plurality of heating elements that discharge approximately the same amount of heat energy. Increasing the heat energy that is applied to the top build layer 42' with increasing radial distance from the central axis 18 can be accomplished by increasing the number of heating elements at increasing radial distances. For example, the heating device 122 may include an increasing number of heating elements 128 at increasing radial distances, as shown in FIG. 11. Similar configurations can be used for the laser sources 110 and other heating elements and devices described herein.

In other embodiments, the heating elements of the selective excitation device 82 discharge a similar amount of heat energy, but are displaced a distance from the surface 68 of the silo support 14 or the surface 94 of the top build layers 42' that increases with increasing radial distance from the central axis 18, such as shown in FIG. 12. The heating elements 128 that are located further from the surfaces 68 and 94 apply a lower dose of heat energy to the underlying surfaces, than the heating elements 128 at greater radial distances from the axis 18 that are located closer to the surfaces 68 and 94.

In some embodiments, a shield and/or reflective components may be used to control the dosage of heat energy that is applied to the top build layers 42' of the working areas 50. For example, a shield can block more of the heat energy discharged from the one or more heating elements of the selective excitation device 82 from reaching portions of the top build layers 42' at shorter radial distances from the central axis 18. Reflective components, such as mirrors or other optical components can direct more of the heat energy discharged from the one or more heating elements of the selective excitation device 82 to the portions of the top build layers 42' at longer radial distances from the central axis 18, for example. Other techniques may also be used to provide the desired variable dosage of heat energy to the top build layers 42' at varying radial distances from the central axis 18.

Embodiments of the build layer analyzer 86 are configured to detect a temperature of each top build layer 42', and/or a condition of the build material in each top build layer 42'. In some embodiments, the controller 12 uses the sensed temperatures or conditions to control aspects of the build process performed using the part developer 32, such as the heating of the portions of the top build layers 42' by the selective excitation device 82, the rotational speed of the tool support 16 relative to the silo support 14, or other aspect of the build process.

Figure 13:
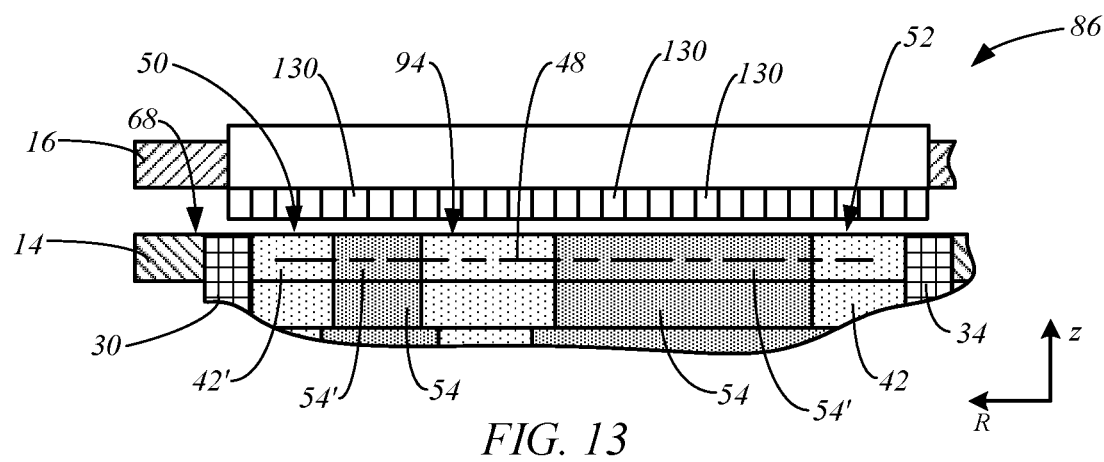
FIG. 13 is a simplified side cross-sectional view of an exemplary build layer analyzer overlaying a working area of a silo, in accordance with embodiments of the present disclosure.

In some embodiments, the analyzer 86 extends in the radial direction over radial positions spanning the radial positions covered by the working areas 50 and the top build layers 42' of each silo 30, as illustrated in FIG. 13. The analyzer 86 can be configured to analyze the top build layers 42' after they have been processed by the selective excitation device 82. The analyzer 86 can be located upstream from the selective excitation device 82 relative to the rotational movement of the silo support 14 from the perspective of the tool support 16. Other configurations may also be used.

The analyzer 86 can include one or more elements 130 in the form of temperature sensors, as illustrated in FIG. 13. Each of the at least one temperature sensor 130 detects a temperature of an underlying portion of the top build layer 42' as the tool support 16 rotates relative to the silo support 14 about the axis 18. The one or more temperature sensors 130 can be an infrared sensor. Other suitable temperatures sensors may also be used. The temperatures sensed by the one or more sensors 130 may be used by the controller 12 to determine a condition of the build material in the top build layers 42', such as whether the desired part portions 54' in the layers 42' have received a sufficient amount of heat energy to crystalize, melt, or fuse the powdered build material into the part portions 54.

In other embodiments, the one or more elements 130 can be a capacitance sensor. The one or more capacitance sensors 130 are each configured to detect a capacitance of portions of the underlying top build layer 42' that is affected by the condition of the build material in the portions, such as whether the build material is in a powdered form, a melted form, or a solid, fused form, for example.

In some embodiments, the part developer 32 includes a planarization device 136, as indicated in FIG. 2. The planarization device 136 is configured to planarize or flatten the surface 94 (FIGS. 8, 10, 12) after processing is completed by the selective excitation device 82 to form the part portions 54 in the top build layer 42'. This maintains a desired thickness of the build layers 42 during the building of the parts 44.

As mentioned above, following a build process, the build material that was not used to form the 3D part 44 may be separated from the 3D part 44 and reused in another build process. However, the partial heating of this build material can adversely affect some of its properties, such as its crystallization, melt, or fuse temperature. As a result, it is desirable to reduce the amount of the build material that forms the build layers 42 and is unused during the build process.

Figure 14:
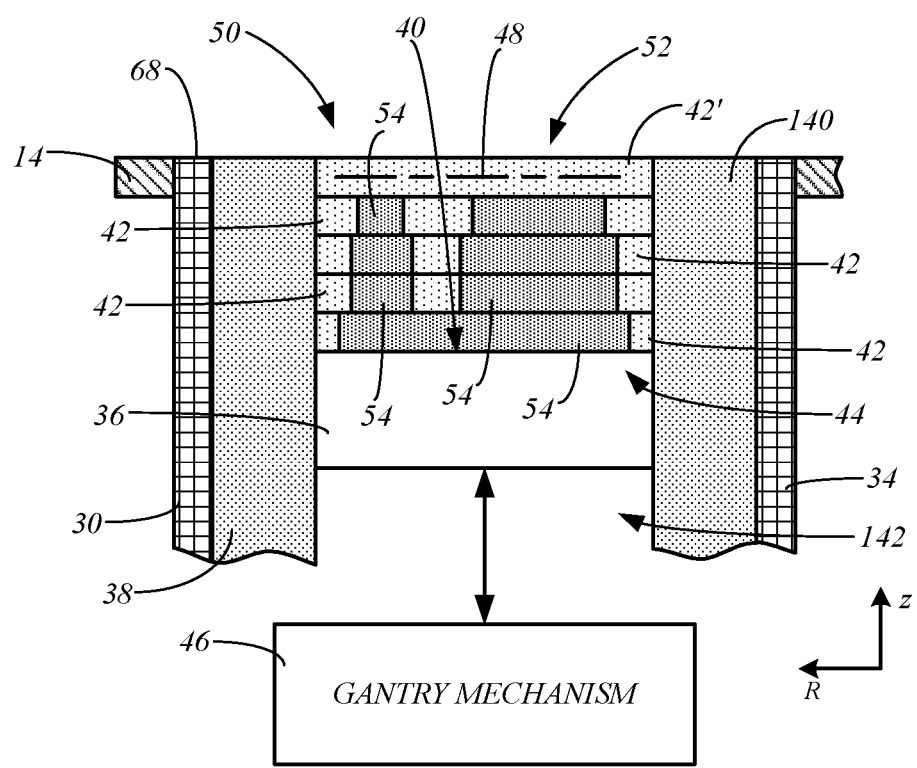
FIG. 14 is a simplified side cross-sectional view of an exemplary silo, in accordance with embodiments of the present disclosure.
Figure 15A:
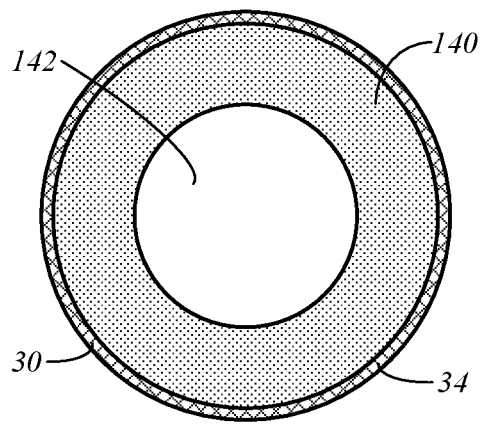
FIGS. 15A-D are simplified cross-sectional views of silo 30 having an insert 140 taken in a plane extending perpendicular to the central axis 18 or the z-axis, in accordance with exemplary embodiments of the present disclosure.
Figure 15B:
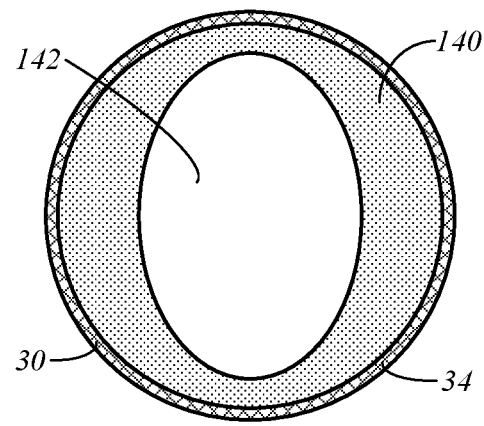
Figure 15C:
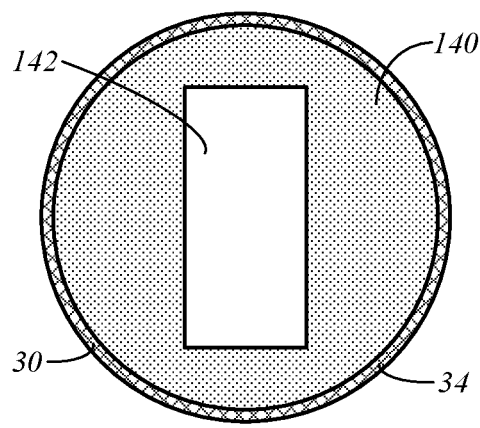
Figure 15D:
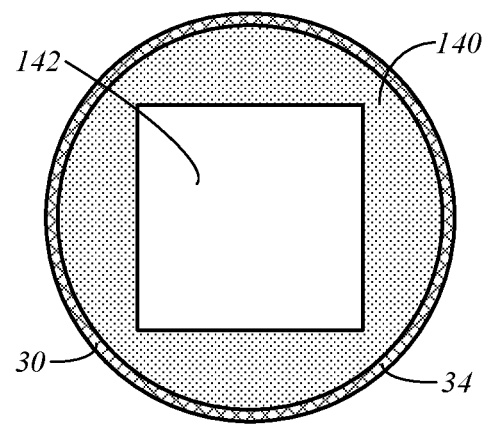

The system 10 can optionally include one or more inserts 140 that may be removably inserted in the silos 30 between the one or more sidewalls 34, as illustrated in FIG. 14. The silo inserts 140 may take on any suitable form and can be attached to the silo 30 using any suitable technique. The inserts 140 can be used to reduce the interior volume 38 of the silos 30 to accommodate for small 3D parts 44. As a result, the inserts 140 can be used to reduce the amount of build material that is required for a given build process.

The optional inserts 140 can include a build platen 36 that is sized in accordance with the cross-sectional area of the interior 142 of the inserts 140 to form a seal with the sidewall to prevent build material from leaking out of the silo 30. In an exemplary embodiment, the build platen 36 is located in a plane that is substantially perpendicular to the central axis 18 or the z-axis. The cross-sectional shape of the interior 142 of each insert 140 may be formed as desired to accommodate a given part 44 that is to be built. FIGS. 15A-D are simplified cross-sectional views of silo 30 having an insert 140 taken in a plane extending perpendicular to the central axis 18 or the z-axis, in accordance with exemplary embodiments of the present disclosure. For example, the cross-sectional shape of the insert 140 may be circular (FIG. 15A), oval (FIG. 15B), rectangular (FIG. 15C), square (FIG. 15D), or other desired shape.

In some embodiments, the system 10 includes a heating unit 150 that is configured to heat the silo support 14 and/or the silos 30, as shown in FIG. 1. This heating maintains the build material in the silos 30 at an optimal temperature range. The heating unit 150 may take on any suitable form. In some embodiments, the heating unit 150 includes one or more heating elements, such as resistive heating elements, heat bulbs (e.g., halogen bulbs), or other suitable heating elements. The heating elements of the heating unit 150 are distributed over the silo support 14 to provide the desired heating. The heating unit 150 can also include one or more heating elements that are configured to heat the build platens 36 within each silo 30.

In some embodiments, the system includes a cooling unit 152 that is configured to cool the tool support 16 and/or components of the part developer 32. The cooling unit 152 maintains the components of the part developer 32 within an operating temperature range by countering the heating performed during the build process. The cooling unit 152 may take on any suitable form. The cooling unit 152 can include one or more passive cooling components, such as a heat sink, or another suitable passive cooling component. The cooling unit 152 can include one or more active cooling components, such as a fan, a blower, a water cooling system, or another suitable active cooling component. The cooling components of the cooling unit 152 can be distributed over the tool support 16 to provide the desired cooling. The system 10 can also optionally include a layer of insulation 154 positioned between the tool support 16 and the silo support 14 to reduce heat transfer therebetween, as indicated in FIG. 1.

In some embodiments, the silo support 14, the tool support 16, and the components that are attached to the silo support 14 and the tool support 16 are contained in a housing. When the build material 57 is in a powdered form, dust may accumulate within the housing, where the dust may adversely affect components of the system 10 and build process performed using the system 10. The system 10 can include an air filtration system 160 that is configured to capture airborne dust. The air filtration system 160 may take on any suitable form, such as a blower fan and filter, for example.

Additional embodiments are directed to methods of building multiple 3D parts using the rotary additive manufacturing system 10. The method generally includes building a 3D part 44 in one or more of the silos 30, in accordance with one or more of the techniques described above.

Figure 16:
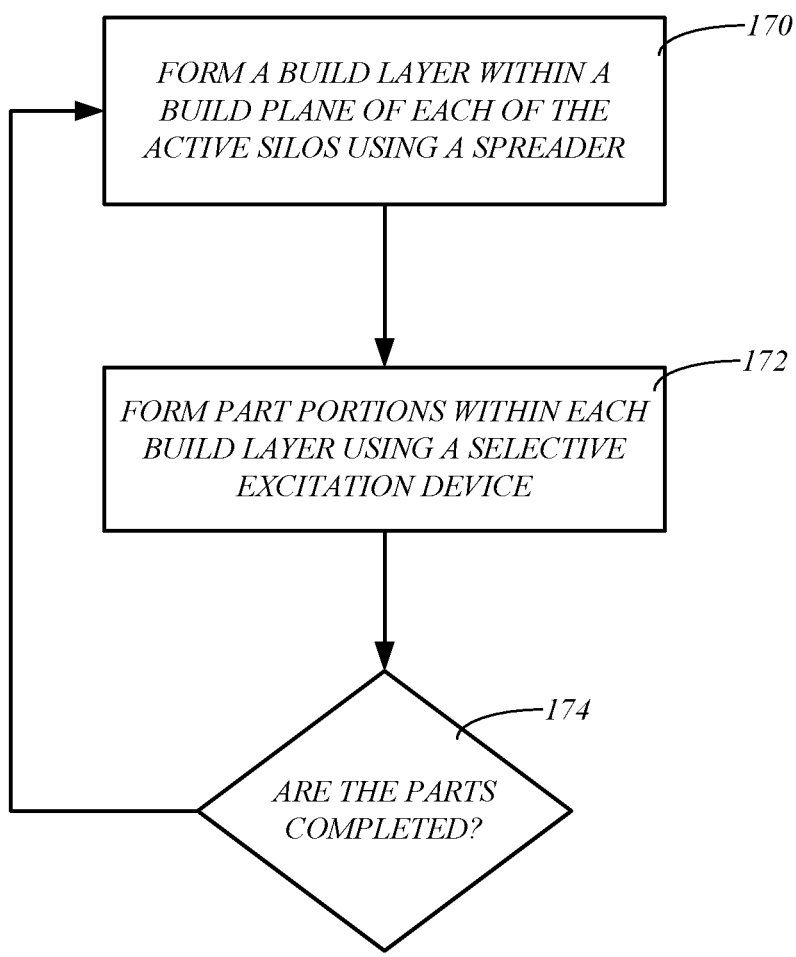
FIG. 16 is a flowchart of a method of building multiple 3D parts using a rotary additive manufacturing system, in accordance with embodiments of the invention.

FIG. 16 is a flowchart of a method of building multiple 3D parts 44 using the rotary additive manufacturing system 10. At step 170, a build layer 42' is formed in a build plane 48 in each of the active silos 30 using a spreader 80 of the part developer 32. As discussed above, embodiments of this step can include the use of a delivery device 66 to feed build material 57 to the spreader 80, for example. The spreader 80 may be in the form of a roller 90, a blade 100, or another suitable spreader. In some embodiments, step 170 is performed as the tool support 16 rotates relative to the silo support 14 about the central axis 18.

At 172 of the method, part portions 54 are formed within each build layer using a selective excitation device 82 of the part developer 32. Each of the part portions 54 correspond to portions of the 3D part 44 within the build layer. In some embodiments, the selective excitation device 82 selectively heats the part portions of the build layers to form the layer of the corresponding part 44. The selective excitation device 82 may take on any of the forms described herein, and may include one or more laser sources, a printing device along with one or more heating elements, and/or other suitable components, as described herein.

At 174 of the method, the steps 170 and 172 are repeated a limited number of times to form the 3D parts 44 in each of the silos 30. In some embodiments, this involves lowering a build platen 36 within the silos, such as using a gantry mechanism 46, for example, to move the processed build layer 42 out of the build plane 48 or working area 50 of each silo 30 to make room for a new build layer 42' to be formed in the build plane 48 of each silo 30.

When the building of one or more of the 3D parts 44 is completed, in some embodiments of the method the part 44 is discharged from the system 10. As mentioned above, this may involve lowering the part through the bottom of the silo 30 by lowering the build platen 36, by removing the silo 30, or using another suitable technique. In some embodiment, during this discharging of the build layers 42 and the 3D part 44 from one of the silos 30, the build processes (170 and 172) may continue to be performed in the other silos 30. After the build layers 42 and part 44 have been discharged from a silo 30, the silo 30 may be reset to allow for the start of a new build process in the silo 30. For example, the build platen 36 that was lowered to remove the build layers 42 and the completed part 44, may be raised again to receive a new top build layer 42'. As a result, embodiments of the system 10 may be operated to substantially continuously build 3D parts 44.

Figure 17:
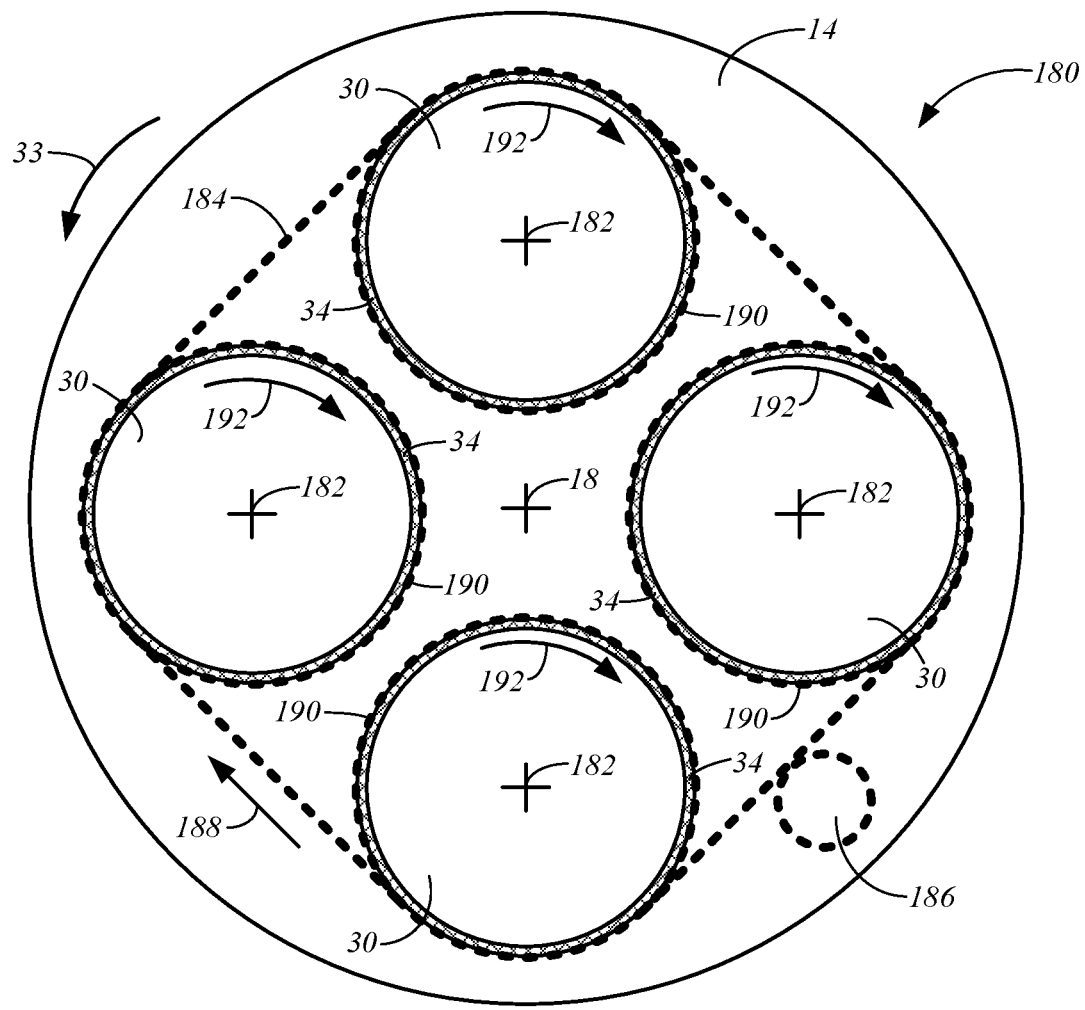
FIG. 17 is a simplified top view of a silo rotation mechanism, in accordance with exemplary embodiments of the present disclosure.

In some embodiments, the system 10 includes a silo rotation mechanism 180 that is configured to rotate each of the silos 30 about its corresponding central axis 182 in during rotation of the silo support 14 about the central axis 18, as illustrated in the simplified top view of FIG. 17. The rotation of the silos 30 about their axes 182 is synchronized with the rotation of the tool support 16 about the axis 18 in the direction 33 relative to the silo support 14, such that the top surfaces 94 of the top build layers 42' in the silos 30 substantially translate rather than rotate relative to a component that is supported on the tool support 16, such as the spreader 80, the selective excitation device 82, the analyzer, 86, and/or other components supported by the tool support 16.

In some exemplary embodiments, the mechanism 180 includes a drive belt 184 that extends around each of the silos, and a drive gear 186. The drive gear 186 intermeshes with the drive belt 184, and drives movement of the belt 184 in a direction 188 during rotation of the tool support 16 in the direction 33 relative to the silo support. The belt 184 engages a ring 190 of the silos, which may include gear teeth, and drives rotation of each the silos 30 about its axis 182 in the direction 192. The drive gear 186 may be driven by the one or more motors 26 (FIG. 1) through a suitable mechanical linkage, such as a belt or gear train, for example. The belt 184 and/or the gear 186 may be replaced by a gear train or other suitable mechanisms.

As used herein the term "about" or "substantially" refers to ±10% and the symbol denotes equality with a tolerance of at most 10%, unless stated otherwise. The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the embodiments of the present disclosure have been described with reference to preferred embodiments, workers skilled in the art will recognize that changes may be made in form and detail without departing from the spirit and scope of the present disclosure.

What is claimed is:

1. A rotary additive manufacturing system for producing 3D parts in a layer-wise manner, the system comprising:
    a silo support;
    a tool support overlaying a first side the silo support and configured to rotate about a central axis relative to the silo support;
    a plurality of silos attached to the silo support, each of the silos extending parallel to and about the central axis from a second side of the silo support that is opposite the first side; and a part developer supported by the tool support and configured to build a 3D part within each of the silos in a layer-by-layer manner during rotation of the tool support relative to the silo support.

2. The system according to claim 1, wherein the part developer comprises a selective excitation device configured to selectively heat part portions of a build layer of build material in each of the silos to form a layer of corresponding ones of the 3D parts.

3. The system according to claim 2, wherein the selective excitation device comprises a plurality of laser sources configured to direct electromagnetic energy to the part portions.

4. The system according to claim 2, wherein the excitation device comprises at least one laser source and a laser director configured to direct electromagnetic energy from the at least one laser source to the part portions.

5. The system according to claim 2, wherein the selective excitation device comprises:
   a printing device configured to apply a print material on print areas corresponding to the part portions; and
   a heating device comprising at least one heating element configured to apply heat to the build material;
   wherein the print material on the print areas absorbs the heat in the part portions.

6. The system according to claim 5, wherein the at least one heating element comprises at least one infrared heating element.

7. The system according to claim 5, wherein the at least one heating element comprises at least one flash lamp.

8. The system according to claim 5, wherein each of the at least one heating element is configured to discharge an electron beam.

9. The system according to claim 5, wherein the printing device comprises an ink jetting head.

10. The system according to claim 2, wherein the selective excitation device is configured to apply an amount of the heat which increases with increasing radial distance from the central axis.

11. The system according to claim 2, wherein the selective excitation device is displaced from a surface of the silo support along an axis parallel to the central axis by a distance that decreases with increasing radial distance from the central axis.

12. The system according to claim 11, wherein the selective excitation device is configured to discharge an amount of the heat which increases with increasing radial distance from the central axis.

13. The system according to claim 2, wherein the part developer includes a build layer analyzer that is configured to detect a condition of the build material in each of the build layers, the condition of the build material being selected from the group consisting of a powdered condition, a melted condition, and a solid condition.

14. The system according to claim 2, further comprising thermal insulation between the tool support and the silo support.

15. The system according to claim 2, wherein the part developer comprises a spreader configured to distribute a supply of the build material within a build plane of each of the silos to form each of the build layers during rotation of the tool support relative to the silo support.

16. The system according to claim 15, wherein:
   the rotary additive manufacturing system includes at least one container configured to contain the supply of build material; and
   the part developer includes a delivery device configured to deliver the supply of build material from the at least one container to the spreader.

17. The system according to claim 16, wherein each of the at least one container has an azimuthal position that is between azimuthal positions of a pair of the silos.

18. The system according to claim 1, wherein each of the plurality of silos includes:
   one or more sidewalls extending parallel to the central axis from the silo support; and
   a build platen contained in an interior thereof and configured to move parallel to the central axis relative to respective ones of the one or more sidewalls and the silo support.

19. The system according to claim 18, further comprising at least one gantry configured to drive the movement of each of the build platens.

20. The system according to claim 18, wherein each of the plurality of silos is removably attached to the silo support.

21. The system according to claim 18, wherein at least one of the plurality of silos includes a removable insert within the interior thereof and between the one or more sidewalls thereof, the removable insert defining an internal cavity that receives a respective one of the build platen.

22. The system according to claim 1, further comprising a frame configured to support the tool support and the silo support.

23. The system according to claim 22, wherein the silo support is configured to rotate about the central axis relative to the frame.

24. A method of building multiple 3D parts in a layer-wise manner using a rotary additive manufacturing system according to claim 1, the method comprising steps of:
   a) forming a build layer within a build plane of each of the silos using a spreader of the part developer while rotating the tool support relative to the silo support about the central axis;
   b) forming part portions of each of the 3D parts within each of the build layers using a selective excitation device of the part developer while rotating the tool support relative to the silo support about the central axis; and
   c) repeating the forming steps a) and b) a limited number of times to print at least one of the 3D parts.

* * * * *